(12) United States Patent
Bogolea et al.

(10) Patent No.: US 11,257,141 B2
(45) Date of Patent: Feb. 22, 2022

(54) METHOD FOR MANAGING CLICK AND DELIVERY SHOPPING EVENTS

(71) Applicant: Simbe Robotics, Inc., San Francisco, CA (US)

(72) Inventors: Bradley Bogolea, San Francisco, CA (US); Jariullah Safi, San Francisco, CA (US)

(73) Assignee: Simbe Robotics, Inc., South San Francisco, CA (US)

(*) Notice: Subject to any disclaimer, the term of this patent is extended or adjusted under 35 U.S.C. 154(b) by 69 days.

(21) Appl. No.: 16/447,846

(22) Filed: Jun. 20, 2019

(65) Prior Publication Data
US 2019/0392506 A1 Dec. 26, 2019

Related U.S. Application Data

(60) Provisional application No. 62/687,728, filed on Jun. 20, 2018.

(51) Int. Cl.
*G06Q 30/06* (2012.01)
*G06Q 10/08* (2012.01)

(52) U.S. Cl.
CPC ....... *G06Q 30/0633* (2013.01); *G06Q 10/087* (2013.01); *G06Q 30/0639* (2013.01)

(58) Field of Classification Search
CPC ... G06Q 30/0601–0643; G06Q 10/087; G06Q 30/0633; G06Q 30/0639
USPC .......................................................... 705/26.8
See application file for complete search history.

(56) References Cited

U.S. PATENT DOCUMENTS

| 5,226,782 A | 7/1993 | Rigling |
| 5,583,950 A | 12/1996 | Prokoski |
| 5,982,932 A | 11/1999 | Prokoski |
| 6,147,686 A | 11/2000 | Brown et al. |

(Continued)

FOREIGN PATENT DOCUMENTS

WO   2017083424 A1   5/2017

OTHER PUBLICATIONS

Whitaker, B. (Mar. 29, 2000). For the small retailer, life on the internet is one big bazaar. New York Times Retrieved from https://dialog.proquest.com/professional/docview/431380265?accountid=131444.*

(Continued)

*Primary Examiner* — Alexis M Casey
(74) *Attorney, Agent, or Firm* — Run8 Patent Group, LLC; Peter Miller; Ryan D. Smith

(57) ABSTRACT

One variation of a method for managing virtual shopping lists includes: dispatching robotic systems, deployed in store, to autonomously scan inventory structures within this store; deriving current stock conditions of this store based on scan data recorded by these robotic systems; initializing a virtual shopping list for a user; in response to receipt of selection of a first product, from a population of products, isolating a subset of stores, in the set of stores in the geographic region, associated with current stock conditions indicating presence of the first product and products previously added to the virtual shopping list; in response to the subset of stores including at least one store, adding a first identifier of the first product to the virtual shopping list; and specifying a particular store, in the subset of stores, for fulfillment of a set of products on the virtual shopping list.

16 Claims, 5 Drawing Sheets

(56) References Cited

U.S. PATENT DOCUMENTS

| | | |
|---|---|---|
| 6,952,705 B2 | 10/2005 | Knoblock et al. |
| 7,287,001 B1 | 10/2007 | Douglas et al. |
| 7,475,205 B2 | 1/2009 | Mcintosh et al. |
| 7,542,883 B2 | 6/2009 | Kumazawa et al. |
| 7,693,757 B2 | 4/2010 | Zimmerman |
| 8,098,888 B1 | 1/2012 | Mummareddy et al. |
| 8,326,451 B2 | 12/2012 | Schantz et al. |
| 8,396,254 B1 | 3/2013 | Hickman |
| 8,910,864 B2 | 12/2014 | Falls et al. |
| 8,954,188 B2 | 2/2015 | Sullivan et al. |
| 8,965,561 B2 | 2/2015 | Jacobus et al. |
| 9,129,251 B2 | 9/2015 | Davidson |
| 9,273,973 B2 | 3/2016 | Sakamoto |
| 9,663,309 B2 | 5/2017 | Priebe et al. |
| D819,712 S | 6/2018 | Gee et al. |
| 10,162,043 B2 | 12/2018 | Simon et al. |
| 2002/0165638 A1 | 11/2002 | Bancroft et al. |
| 2003/0154141 A1 | 8/2003 | Capazario et al. |
| 2004/0162765 A1 | 8/2004 | Reber |
| 2005/0216182 A1 | 9/2005 | Hussain et al. |
| 2005/0222898 A1 | 10/2005 | Kumazawa et al. |
| 2005/0261975 A1 | 11/2005 | Carver |
| 2007/0019889 A1 | 1/2007 | Peter Miller et al. |
| 2007/0061041 A1 | 3/2007 | Zweig |
| 2008/0024300 A1 | 1/2008 | Fawcett et al. |
| 2008/0077511 A1* | 3/2008 | Zimmerman .......... G06Q 10/00 705/28 |
| 2009/0012667 A1 | 1/2009 | Matsumoto et al. |
| 2009/0012704 A1* | 1/2009 | Franco .................. G01C 21/20 701/532 |
| 2009/0063307 A1* | 3/2009 | Groenovelt .......... G06Q 10/087 705/28 |
| 2009/0138151 A1 | 5/2009 | Smid et al. |
| 2009/0325598 A1 | 12/2009 | Guigne et al. |
| 2010/0070369 A1 | 3/2010 | Fenton et al. |
| 2010/0131377 A1 | 5/2010 | Kamalkar et al. |
| 2010/0178982 A1 | 7/2010 | Ehrman et al. |
| 2010/0217681 A1* | 8/2010 | Geikie .................. G06Q 30/06 705/26.1 |
| 2011/0184751 A1 | 7/2011 | Holmes |
| 2011/0261049 A1 | 10/2011 | Cardno et al. |
| 2012/0123673 A1 | 5/2012 | Perks et al. |
| 2012/0126000 A1 | 5/2012 | Kunzig et al. |
| 2012/0275642 A1 | 11/2012 | Aller et al. |
| 2012/0323620 A1 | 12/2012 | Hofman et al. |
| 2013/0173435 A1 | 7/2013 | Cozad, Jr. |
| 2013/0185150 A1 | 7/2013 | Crum |
| 2013/0191193 A1* | 7/2013 | Caiman ................ G01C 21/362 705/14.4 |
| 2013/0191246 A1 | 7/2013 | Calman et al. |
| 2014/0006229 A1 | 1/2014 | Birch et al. |
| 2014/0019314 A1 | 1/2014 | Nordman et al. |
| 2014/0067564 A1 | 3/2014 | Yuan |
| 2014/0121833 A1 | 5/2014 | Lee et al. |
| 2014/0201041 A1 | 7/2014 | Meyer |
| 2014/0247116 A1 | 9/2014 | Davidson |
| 2014/0277691 A1 | 9/2014 | Jacobus et al. |
| 2014/0279294 A1* | 9/2014 | Field-Darragh ..... H04B 5/0062 705/28 |
| 2014/0297476 A1 | 10/2014 | Wang et al. |
| 2014/0361077 A1 | 12/2014 | Davidson |
| 2015/0052029 A1 | 2/2015 | Wu et al. |
| 2015/0073586 A1 | 3/2015 | Weiss |
| 2015/0073588 A1 | 3/2015 | Priebe et al. |
| 2015/0088701 A1 | 3/2015 | Desmarais et al. |
| 2015/0088937 A1 | 3/2015 | Lons et al. |
| 2015/0161715 A1 | 6/2015 | Rose |
| 2015/0168166 A1 | 6/2015 | Sakamoto |
| 2015/0248591 A1 | 9/2015 | Shi et al. |
| 2015/0262116 A1 | 9/2015 | Katircioglu et al. |
| 2015/0262118 A1 | 9/2015 | Grissom et al. |
| 2015/0363758 A1 | 12/2015 | Wu et al. |
| 2017/0193434 A1 | 7/2017 | Shah et al. |
| 2017/0286773 A1* | 10/2017 | Skaff .................... G06N 3/0454 |
| 2018/0130072 A1* | 5/2018 | Ouimet ................ G06Q 30/02 |

OTHER PUBLICATIONS

Mohd San! Mohamad Hashim et al: "Multiple waypoints trajectory planning with specific position, orientation, velocity and time using geometric approach for a car-like robot", Australasian Conference on Robotics and Automation (ACRA), Dec. 4, 2009 (Dec. 4, 2009), XP55631280, ISBN: 978-0-9807404-0-0, 7 pages.

Lee, Kwon and Chulhee LEE, "Fast Object Detection Based on Color Histograms and Local Binary Patterns," TENCON 2012 IEEE Region 10 Conference, IEEE, Nov. 19, 2012, 4 pages.

International Search Report and Written Opinion for International Patent Application No. PCT/US2019/038325, dated Oct. 22, 2019, 5 pages.

* cited by examiner

METHOD FOR MANAGING CLICK AND DELIVERY SHOPPING EVENTS

CROSS-REFERENCE TO RELATED APPLICATIONS

This application claims the benefit of U.S. Provisional Application No. 62/687,728, filed on 20 Jun. 2018, which is incorporated in its entirety by this reference.

This application is related to U.S. patent application Ser. No. 15/347,689, filed on 9 Nov. 2016, and to U.S. patent application Ser. No. 15/600,527, filed on 19 May 2017, each of which is incorporated in its entirety by this reference.

TECHNICAL FIELD

This invention relates generally to the field of inventory management and more specifically to a new and useful method for managing click and delivery shopping events in the field of inventory management.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
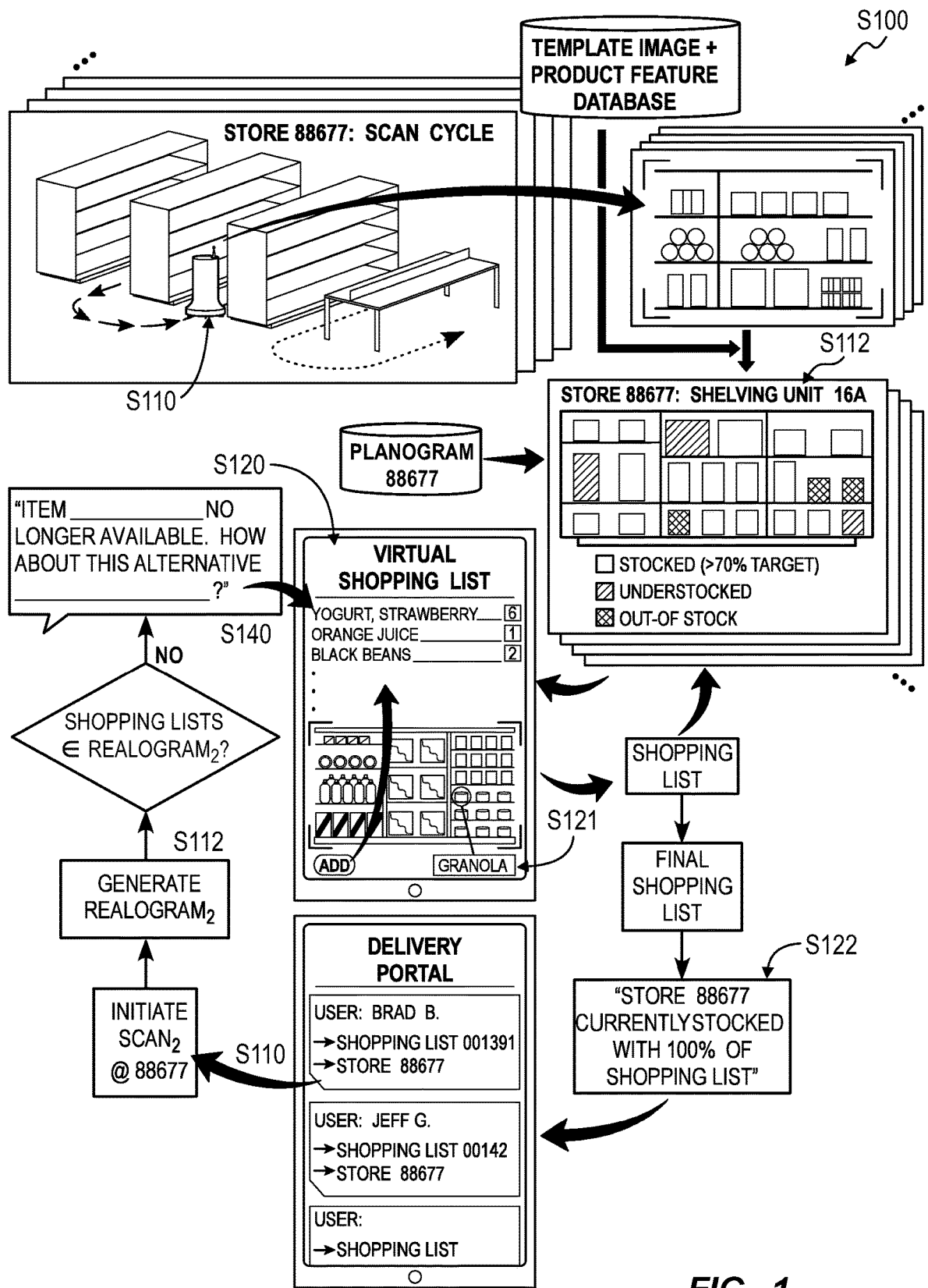
FIG. 1 is a flowchart representation of a method.

As shown in FIG. 1, a method S100 for managing click and delivery shopping events includes, over a first period of time, for each store in a set of stores within a geographic region: dispatching a mobile robotic system, deployed in the store, to autonomously scan inventory structures within the store in Block S110; and deriving a current stock condition of the store based on scan data recorded by the mobile robotic system in Block S112. The method S100 also includes, over a second period of time succeeding the first period of time: initiating a virtual shopping list at a computing device for a user within the geographic region in Block S120; in response to receipt of selection of a product at the computing device, isolating a subset of stores, in the set of stores, corresponding to current stock conditions including the product and a preceding set of products in the virtual shopping list in Block S122 and, in response to the subset of stores including at least one store, appending the product to the virtual shopping list in Block S124; and dispatching a delivery associate to a particular store, in the subset of stores, to fulfill the virtual shopping list in Block S130. The method S100 further includes, over a third period of time succeeding the second period of time: dispatching a particular mobile robotic system, deployed in the particular store, to autonomously scan inventory structures within the particular store in Block S110; updating a current stock condition of the particular store based on scan data recorded by the particular mobile robotic system in Block S112; and, in response to the current stock condition of the particular store excluding a particular product on the virtual shopping list prior to fulfillment of the virtual shopping list by the delivery associate, serving a prompt to the computing device to replace the particular product in the virtual shopping list in Block S140.

The method S100 can additionally or alternatively include, in response to the current stock condition of the particular store excluding a particular product on the virtual shopping list prior to arrival of the delivery associate at the particular store: isolating a second store, in the set of stores, corresponding to a current stock condition including products in the virtual shopping list in Block S122; and dispatching the delivery associate to the second store, rather than the particular store, to fulfill the virtual shopping list in Block S130.

Figure 5:
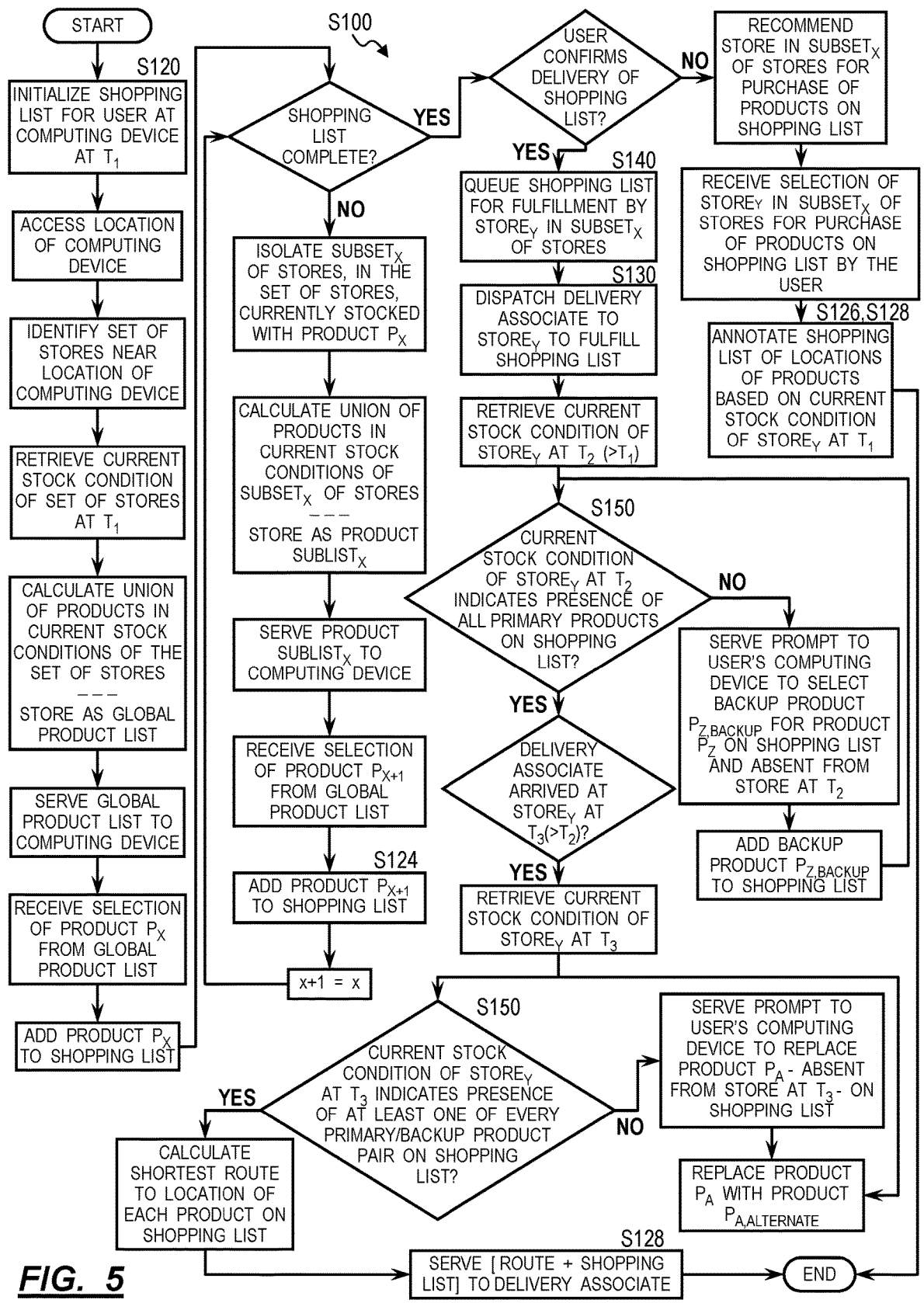
FIG. 5 is a flowchart representation of one variation of the method.

One variation of the method S100 shown in FIGS. 1 and 5 includes, during a first period of time, for each store in a set of stores within a geographic region: dispatching a mobile robotic system, deployed in the store, to autonomously scan inventory structures within the store in Block S110; and deriving a current stock condition of the store based on scan data recorded by the mobile robotic system in Block S112. The method S100 also includes, during a second period of time succeeding the first period of time: initializing a virtual shopping list for a user at a computing device within the geographic region in Block S120; in response to receipt of selection of a first product, from a population of products, at the computing device, isolating a subset of stores, in the set of stores, associated with current stock conditions identifying presence of the first product and products previously added to the virtual shopping list in Block S122; and, in response to the subset of stores including at least one store, adding a first identifier of the first product to the virtual shopping list in Block S124. This variation of the method S100 further includes specifying a particular store, in the subset of stores, for fulfillment of a set of products on the virtual shopping list in Block S140.

Another variation of the method S100 shown in FIGS. 1 and 5 includes, during a first period of time: dispatching a mobile robotic system, deployed in the store, to autonomously scan inventory structures within the store during a first scan cycle in Block S110; and deriving a current stock condition of the store based on scan data recorded by the mobile robotic system during the first scan cycle in Block S112. This variation of the method S100 also includes, during a second period of time succeeding the first period of time: initializing a virtual shopping list for a user at a computing device within the geographic region in Block S120; serving a first photographic image of an inventory structure in the store to the computing device, the first photographic image generated based on scan data recorded by the mobile robotic system during the first scan cycle in Block S121; and, in response to receiving selection of a first product from the first photographic image, adding a first identifier of the first product to the virtual shopping list in Block S124. This variation of the method S100 further includes: extracting a first location of the first product in the store based on scan data recorded by the mobile robotic system in Block S126; and annotating the virtual shopping list with the first location of the first product in the store in Block S128.

Yet another variation of the method S100 shown in FIGS. 1 and 5 includes: dispatching a robotic system, deployed in the store, to autonomously scan inventory structures within the store during a first scan cycle in Block S110; and deriving a first stock condition of the store at a first time based on scan data recorded by the robotic system during the first scan cycle in Block S112. This variation of the method similarly includes: dispatching the robotic system to autonomously scan inventory structures within the store during a second scan cycle succeeding the first scan cycle in Block S110; and deriving a second stock condition of the store at a second time a) for a first subset of slots in the store, obscured from scan data recorded by the robotic system during the second scan cycle, based on scan data recorded by the robotic system during the first scan cycle and b) for a second subset of slots in the store based on scan data depicting the second subset of slots and recorded by the robotic system during the second scan cycle in Block S112. This variation of the method S100 also includes: generating a product location map identifying locations of products in the store based on a combination of the first stock condition and the second stock condition of the store in Block S114; accessing a virtual shopping list, submitted by a user, specifying a set of products for fulfillment at the store; verifying presence of each product, in the set of products in the virtual shopping list, in the store based on the second stock condition in Block S150; and annotating the shopping list with locations of the set of products specified in the virtual shopping list based on the product location map in Block S128.

2. Applications

Generally, the method S100 can be executed by a system: to autonomously record a stock condition of a particular store (e.g., a grocery store, a clothing store); to interface with a user to construct a virtual shopping list specifying quantities of various items based on the current stock condition of the particular store; to dispatch (or interface with an external entity that dispatches) a delivery associate to the particular store to fulfill this shopping list and to deliver these products to the user; to autonomously collect new stock data from the particular store and to update the stock condition of the particular store accordingly; and to automatically divert the delivery associate to another store that is currently stocking more products on the user's shopping list or to automatically prompt the user to select an alternative product that is currently stocked in the particular store if the computer system determines from a recent scan of the particular store that a product on the shopping list is no longer available at the particular store.

In particular, the computer system can interface with a mobile robotic system deployed in a store to collect scans of inventory structures and other product displays in the store—with low temporal error—from these scans, such as once per day, once per hour, or continuously while the store is in operation. The computer system can then interface with a user to construct a shopping list that is based on this current stock condition of the store in order to: improve probability that all products on this shopping list are present in the store at the time a delivery associate arrives at the store to collect these products for delivery to the user; improve delivery associate efficiency; and improve this "click and delivery" for the user. The computer system can additionally or alternatively: implement similar methods to track current stock conditions in multiple stores throughout a geographic region, such as in one or several retail franchises; filter stores in this geographic region with current stock conditions that contain each product on the user's shopping list as the user constructs this shopping list; and then dispatch a delivery associate to a particular store currently stocked with each product on the final shopping list submitted by the user, thereby providing greater flexibility to the user when constructing the shopping list while also maintaining a high probability that all products on this shopping list are present in a store selected for this shopping list, improving the delivery associate's efficiency, and improving this "click and delivery" for the user.

For example, the computer system can include or interface with: a mobile robotic system containing a set of optical sensors and configured to autonomously navigate throughout a store and to record optical scans (e.g., 2D color and/or 3D depth images) of inventory structures and displays throughout the store; a computer system (e.g., a remote server) configured to extract positions, orientations, and quantities of products on shelves in the store from optical scans recorded by the mobile robotic system and to construct a current stock condition of the store accordingly; a customer portal, such as accessed through a native application or a web browser executing on a computing device (e.g., a smartphone, a desktop computer), that interfaces with a user to generate a shopping list based on product selections entered by the user; and a delivery service or delivery portal that dispatches a delivery associate to a store to fulfill a shopping list submitted through the customer portal. The computer system can additionally or alternatively include or interface with mobile sensors deployed in a store to collect RFID or other non-optical scan data and/or with fixed sensors deployed in the store to collect optical or non-optical scans of the store; and the computer system can implement similar methods and techniques to interpret a stock condition of all or portions of the store based on data collected by these sensors.

The computer system can also interface with an internal fulfillment process within a store: to collect scan data recorded by a mobile robotic system autonomously navigating throughout the store; to extract a current stock condition of the store from these scan data; and to filter product selections entered by a user interfacing with her personal computing device (e.g., a smartphone, a tablet) to populate her shopping list based on the current stock condition of the store (e.g., until the mobile robotic system rescans the store), such as before submitting the shopping list for fulfillment by the store (e.g., a store associate) or before personally visiting the store to purchase products on this shopping list.

Therefore, by collecting scan data from a mobile robotic system and/or other sensors deployed in a store and by extracting a current stock condition of the store in (near) real-time from these scan data, the computer system can leverage the current stock condition of the store to control product selection options for a user building a virtual shopping list for fulfillment by a delivery associate or by the store and to isolate a particular store to fulfill this shopping list. The computer system can thus execute Blocks of the method S100: to increase probability that the store assigned to this shopping list is stocked with all products specified in this shopping list when a store associate or external delivery associate prepares to fulfill the shopping list; and to preemptively prompt or enable the user to select alternatives for out-of-stock products based on subsequent changes in the stock condition of the store (e.g., as detected in scan data captured by the mobile robotic system during a scan cycle, or an "inventory tracking routine") between submission and fulfillment of the shopping list.

For example, the computer system can: regularly update a record of the current stock condition of the store based on scan data recorded by the mobile robotic system and/or by other sensors in the store during subsequent scan cycles; query a shopping list currently queued for fulfillment at the store against the current stock condition of the store to confirm that all products on the shopping list are in-stock following each update of the store state record for the store; and then selectively serve a prompt to a user affiliated with this shopping list to elect an alternate product in response to identifying a particular product on the original shopping list that is no longer in stock at the store. The computer system can therefore execute Blocks of the method S100 to: improve transparency for the user; enable direct control of product replacements for out-of-stock products for the user; reduce time spent and a burden of identifying and replacing out-of-stock products experienced by store or delivery associates dispatched to fulfill this shopping list; and improve efficiency of order fulfillment for both the user and the store or delivery associate.

Furthermore, the computer system can leverage the (near) real-time stock condition of the store—derived from current scan data collected by mobile and/or fixed sensors deployed in the store—to calculate a route through the store for a delivery associate dispatched to the store to fulfill a shopping list. For example, the computer system can: aggregate locations of products detected in scan data recorded by the mobile robotic system over multiple scan cycles (e.g., one per day for one week) to generate a realogram depicting true locations of slots and their product assignment throughout the store; generate a list of locations (e.g., aisle, inventory structure shelving structure, shelving segment, shelf, and slot number) of slots assigned to all products on a shopping list queued for fulfillment at the store; calculate a shortest path (or "route") from an entry of the store, through the location of each product on the shopping list, and to a checkout lane or exit at the store; and serve this path to a delivery associate's mobile device (e.g., upon arrival of the mobile device within a geofenced area associated with the store) in order to guide the delivery associate to target locations throughout the store and thus enable the delivery associate to rapidly retrieve every product on this shopping list, even if the delivery associate is unfamiliar with this store.

The computer system can implement similar methods and techniques to inform a user of a change in availability of a product on her shopping list prior to completing a shopping list and prior to the user arriving at a store to personally fulfill this shopping list, thereby enabling the user to reach a more informed decision regarding whether to elect an alternate store for fulfillment of this shopping list, remove or replace an out-of-stock product on her shopping list with an alternate product, or delay a visit to the store.

Furthermore, the method S100 is described herein as executed by the computer system: to monitor stock conditions of a store based on scan data collected by a robotic system executing a continuous scan cycle or an intermittent scan cycle in the store, such as before, during, and/or after open store hours; and to support users and delivery associates to populate and fulfill shopping lists based on stock conditions of the store over time. However, the computer system can execute Blocks of the method S100 to monitor stock conditions of the store based on data collected by one or more fixed sensors (e.g., fixed cameras) arranged throughout the store or any other sensor deployed to the store.

3. Hierarchy and Terms

A "product facing" is referred to herein as a side of a product (e.g., of a particular SKU or other product identifier) designated for a slot. A "planogram" is referred to herein as a graphical representation of target locations of product facings across inventory structures within a store (e.g., across an entire store). Product identification, placement, and orientation data recorded visually in a planogram can be also be recorded in a corresponding textual product placement spreadsheet, slot index, or other store database (hereinafter a "product placement database").

A "slot" is referred to herein as a section of a shelf designated for occupation by one product facing, including a row of one or more units of a product. A "shelf" is referenced herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures or other inventory structures. A "store" is referred to herein as a (static or mobile) facility containing one or more shelving structures or shelving structures and one or more aisles.

A "product" is referred to herein as a type of packaged good associated with a particular product identifier (e.g., a SKU). A "unit" or "product unit" is referred to herein as an instance of a product, such as one packaged article in a set of packaged articles associated with one SKU value.

A "stock condition" of a store is referred to herein as presence or quantities of products throughout the store, such as based on scan data recorded during a last or ongoing scan cycle by the mobile robotic system operating within the store. Actual locations of product facings in the store—derived from these same scan data—can be represented in a "realogram" of the store. The computer system can thus pair the stock condition and the realogram of the store to communicate both presence (and quantities) of products in the store and locations of these products in the store, respectively, such as to enable a user to populate a shopping list with product verified as stocked in the store and/or to inform a path to retrieve products on a shopping list following arrival at the store.

The method S100 is described herein as executed by a computer system (e.g., a remote server, hereinafter the "system"). However, Blocks of the method S100 can be executed by one or more mobile robotic systems deployed in a retail space (or store, warehouse, etc.), by a local computer system, or by any other local or distributed computer network. Furthermore, Blocks of the method S100 are described below as executed by the computer system to track stock conditions of open shelves on shelving structures within a store. However, the computer system can implement similar methods and techniques to detect and track stock conditions of cubbies, refrigeration units, wall racks, freestanding floor racks, and/or tables, etc. within a retail space.

4. Mobile Robotic System

A mobile robotic system (hereinafter the "robotic system") is configured to autonomously navigate throughout a store and to capture images of shelving structures and other product displays throughout a store. Generally, the robotic system can define a network-enabled mobile robot that can autonomously traverse a store, capture images of shelves within the store, and upload those images to a computer system for analysis.

Figure 3:
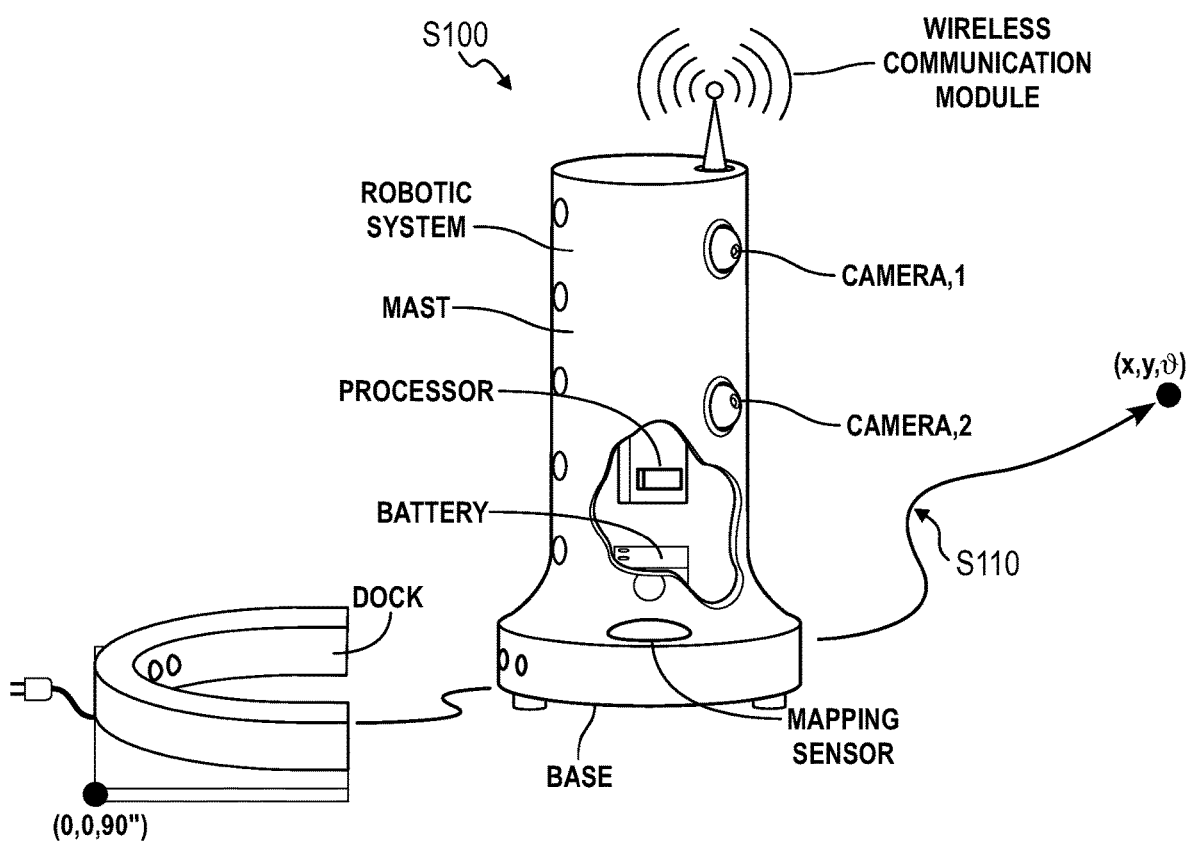
FIG. 3 is a schematic representation of one variation of the method.

In one implementation, the robotic system defines an autonomous imaging vehicle including: a base; a drive system (e.g., a pair of two driven wheels and two swiveling casters) arranged in the base; a power supply (e.g., an electric battery); a set of mapping sensors (e.g., fore and aft scanning LIDAR systems); a processor that transforms data collected by the mapping sensors into two- or three-dimensional maps of a space around the robotic system; a mast extending vertically from the base; a set of cameras arranged on the mast; a geospatial position sensor (e.g., a GPS sensor); and a wireless communication module that downloads waypoints and a master map of a store from a computer system (e.g., a remote server) and that uploads photographic images captured by the camera and maps generated by the processor to the computer system, as shown in FIG. 3. In this implementation, the robotic system can include cameras mounted statically to the mast, such as two vertically offset cameras on a left side of the mast and two vertically offset cameras on the right side of mast, as shown in FIG. 3. The robotic system can additionally or alternatively include articulable cameras, such as: one camera on the left side of the mast and supported by a first vertical scanning actuator; and one camera on the right side of the mast and supported by a second vertical scanning actuator. The robotic system can also include a zoom lens, a wide-angle lens, or any other type of lens on each camera. However, the robotic system can define any other form and can include any other subsystems or elements supporting autonomous navigating and image capture throughout a store environment.

The robotic system also includes an RFID antenna and an RFID reader that cooperate to: broadcast an interrogation signal; and to collect and discern inbound RF signals broadcast from RFID tags excited by the interrogation signal. In one variation, the robotic system includes multiple RFID antennas. For example, the robotic system can include a first RFID antenna arranged in a first polarization orientation at a first position along the mast; and a second RFID antenna arranged in a second polarization orientation at a second position along the mast. In this example, the second polarization orientation can be angularly offset from the first polarization orientation by a known angle (e.g., 90°) about a horizontal axis of the robotic system; and the second position can be vertically offset above the first position by a known distance (e.g., 50 centimeters). During a scan routine, the robotic system can: trigger both the first and second RFID antennas to broadcast interrogation signals; collect RF signals through both the first and second RFID antennas; and compile these RF signals and related metadata into a 2D or 3D map of locations of RFID tags—from which these RF signals originated—based on known linear offsets between the first and second antennas. Furthermore, a particular RFID tag parallel to the plane of propagation of an interrogation signal broadcast by the first antenna may not return an RF signal to the robotic system; however, because the second antenna is angularly offset from the first antenna, the particular RFID tag may be necessarily non-parallel to the plane of propagation of an interrogation signal broadcast by the second antenna. Therefore, the robotic system can include two (or more) non-parallel RFID antennas in order to enable collection of RF signals from a greater proportion of nearby RFID tags, including RFID tags that may be obscured from one RFID antenna in the set.

The computer system can also interface with multiple robotic systems placed in a single store and configured to cooperate to image shelves within the store. For example, two robotic systems can be placed in a large single-floor store and can cooperate to collect images of all shelves in the store within a threshold period of time (e.g., within one hour). In another example, one robotic system can be placed on each floor of a multi-floor store, and each robotic system can each collect images of shelves on its corresponding floor. The computer system can then aggregate images captured by multiple robotic systems placed in one store to generate a graph, map, table, and/or task list of properly- and improperly-stocked slots within the store.

4.1 Fixed Sensors

The computer system can additionally or alternatively include or interface with fixed sensors arranged throughout a store to collect optical or non-optical scan data representing products stocked throughout the store. For example, a set of fixed 2D or 3D color or hyperspectral cameras can be mounted over aisles and displays in the store and can be configured to regularly record and return scan data to the computer system, such as once per one-minute interval via the Internet or other computer network while the store is in operation.

However, the computer system can interface with any other fixed or mobile sensor deployed in a store in order to collect data representing types, quantities, and locations of product currently stocked in the store.

5. Robotic System Dispatch and Stock Condition Derivation

Block S110 of the method S100 recites, for each store in a set of stores within a geographic region, dispatching a robotic system, deployed in the store, to autonomously scan shelving structures within the store. Generally, in Block S110, the computer system can interface with mobile robotic systems deployed in various stores within a geographic region to initiate scan cycles of fixed duration (e.g., one scan of all aisles) or to initiate continuous scans (e.g., continuously during hours of operation) in these stores.

Block S112 of the method S100 recites deriving a current stock condition of the store based on scan data recorded by the robotic system during the first scan cycle. Generally, in Block S112, the computer system can extract the stock condition of a store from scan data recorded by the robotic system and/or by fixed sensors deployed in the store. In one implementation, as a robotic system in a store—in this set of stores—records optical scans (e.g., 2D color images and 3D point clouds) of shelving segments and other displays in this store and returns these optical scans to the computer system, the computer system can: stitch a sequence of images recorded by the robotic system while navigating along a shelving structure into a composite image of the shelving structure; implement computer vision techniques to detect and identify shelving segments, shelves, and individual product units in the composite image; and generate a realogram of the shelving segment accordingly.

Figure 2:
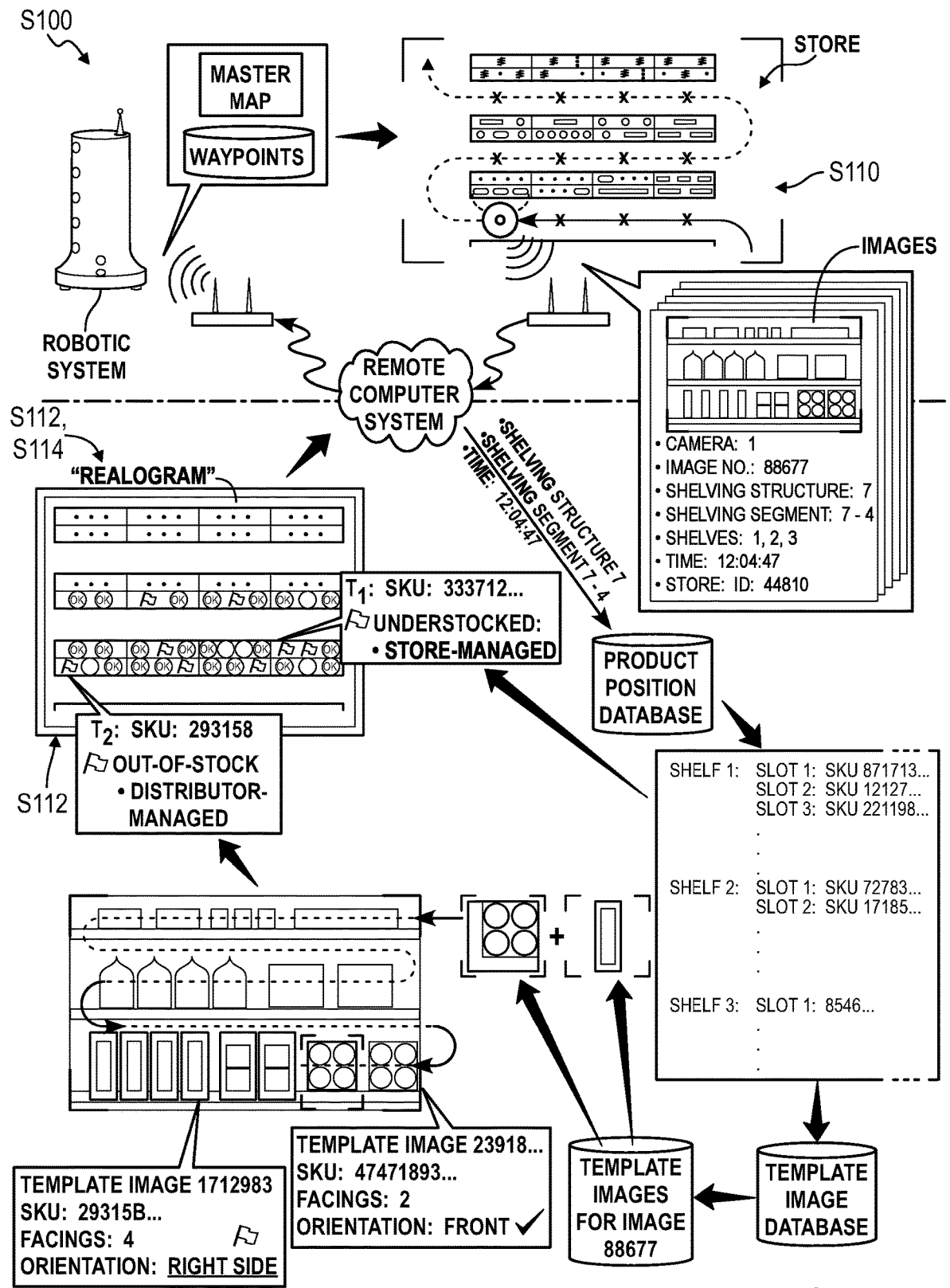
FIG. 2 is a flowchart representation of one variation of the method.

The computer system can repeat this process to generate a realogram of other shelving structures and product displays throughout the store and can compile these realograms into one composite realogram of the store, such as described in U.S. patent application Ser. No. 15/600,527 and shown in FIG. 2.

5.1 Scan Cycle: Waypoints

In one implementation, the computer system: defines a set of waypoints specifying target locations within the store through which the robotic system navigates and capture images of inventory structure throughout the store during a scan cycle; and intermittently (e.g., twice per day) dispatches the robotic system to navigate through this sequence of waypoints and to record images of inventory structures nearby during a scan cycle. For example, the robotic system can be installed within a store, and the computer system can dispatch the robotic system to execute a scan cycle during store hours, including navigating to each waypoint throughout the store and collecting data representative of the stock state of the store in near real-time as patrons move, remove, and occasionally return product on, from, and to inventory structures within the store (e.g., shelving structures, refrigeration units, displays, hanging racks, cubbies, etc.). During this scan cycle, the robotic system can: record black-and-white or color photographic images of each inventory structure; record thermographic images of select inventory structures in the store (e.g., refrigeration units); record multi-spectral images of other inventory structures within the store (e.g., inventory structures stocked with fresh produce); and/or broadcast radio frequency queries and record radio frequency identification (or "RFID") data from RFID tags arranged on or integrated into products stocked throughout the store.

The computer system can therefore maintain, update, and distribute a set of waypoints to the robotic system, wherein each waypoint defines a location within a store at which the robotic system is to capture one or more images from the integrated thermographic, depth, and/or color cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("a") relative to the origin of the store, based on an angular position of an aisle or shelving structure in the coordinate system, as shown in FIG. 5. When executing a waypoint, the robotic system can orient to (e.g., within 1.5° of) the target orientation defined in the waypoint in order to align a camera to an adjacent shelving structure.

When navigating to a next waypoint, the robotic system can scan an environment nearby with the depth sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,∂) location and target orientation defined in this next waypoint. A waypoint can also include a geospatial position (e.g., a GPS location), such as in the form of a backup or redundant location. For example, when navigating to a waypoint, the robotic system can approach the geospatial position defined in the waypoint; once within a threshold distance (e.g., five feet) from the geospatial position, the robotic system can navigate to a position and orientation at which the output of the depth sensor aligns—within a threshold distance and angle—with a region of the master map corresponding to the (x,y,∂) location and target orientation defined in the waypoint.

Furthermore, a waypoint can include an address of each camera in the robotic system designated for data capture in this waypoint. For example, for the robotic system that includes a thermographic camera, a depth camera, and a color camera, the waypoint can include all or a subset of camera addresses [1, 2, 3] corresponding to a thermographic camera, a depth camera, and a color camera, respectively. Alternatively, for the robotic system that includes articulable cameras, a waypoint can define an address and arcuate position of each camera designated for image capture when the robotic system occupies this waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated depth sensors (e.g., a LIDAR sensor) and construct a new map of its environment based on data collected by the depth sensors. By comparing the new map to the master map, the robotic system can track its location within the store throughout the scan cycle. Furthermore, to navigate to a next waypoint, the robotic system can confirm its achievement of the waypoint—within a threshold distance and angular offset—based on alignment between a region of the master map corresponding to the (x,y,∂) location and target orientation defined in the current waypoint and a current output of the depth sensors, as described above.

However, the robotic system can implement any other methods or techniques to navigate to a position and orientation within the store within a threshold distance and angular offset from a location and target orientation defined in a waypoint.

5.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during a scan cycle to maximize a value of inventory structures or particular products imaged by the robotic system per unit time responsive to dynamic obstacles within the store (e.g., patrons, spills), such as described in U.S. patent application Ser. No. 15/347,689.

In this implementation, the robotic system can then continuously capture images of inventory structures in the store (e.g., at a rate of 10 Hz, 24 Hz). Alternatively, the robotic system can: process depth data captured by the robotic system in real-time or scan a 2D or 3D map of the store generated during the scan cycle to track a distance from an optical sensor on the robotic system to an inventory structure nearby; and selectively trigger this optical sensor to capture images of the inventory structure at a frequency that yields a target offset (e.g., 20%, or between 10% and 40%) between consecutive images at a plane intersecting a face of the inventory structure.

However, in this implementation, the robotic system can capture images of inventory structures within the store at any other frequency during this scan cycle. The robotic system can similarly capture other scan data of these inventory structures while navigating dynamically throughout the store, such as thermographic images, multi-spectral images, and/or RFID data.

5.3 Scan Cycle Scheduling

In one implementation, the robotic system can continuously navigate and capture scan data of inventory structures within the store; when a state of change of a battery in the robotic system drops below a threshold state, the robotic system can return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of stock condition changes as patrons remove, return, and/or move products throughout the store; and/or every night during close or slow hours (e.g., 1 AM) to enable detection of stock conditions and systematic restocking of understocked slots in the store before the store opens the following morning or before a next peak period in the store.

In another implementation, the computer system can track demand for products in a geographic region based on products in pending or queued shopping lists originating in the geographic region and/or based on sale data from a point-of-sale system in the store and then queue the robotic system to scan target slots assigned to particular products exhibiting relatively high demand at the current time (e.g., over the last hour or since a last scan cycle at the store). For example, the computer system can: track demand for a particular product in the geographic region based on frequency of virtual shopping lists originating within the geographic region and containing an identifier of this particular product. Then, if demand for this particular product within the geographic region exceeds a threshold demand—such as if a quantity of units of the particular product in these pending, unfulfilled shopping lists exceeds a threshold proportion (e.g., 50%) of a quantity of units of the particular product predicted to occupy all slots designating the particular product in the store based on the current stock condition of the store—the computer system can: dispatch the robotic system to autonomously capture a set of images of inventory structures containing slots assigned to the particular product within the store; scan this set of images for presence of the particular product in each slot in this set of slots assigned to the particular product; and then update a current stock condition of the store for this period of time to reflect presence of the first product in this set of slots thus derived from these images.

Therefore, the computer system can dynamically schedule scan cycles for the robotic system in order to access availability data for targeted products based on elevated demand for these targeted products in the geographic region, as indicated by pending or queued shopping lists originating in this geographic region. The computer system can then leverage these targeted availability data to preemptively reroute a delivery associate to another store that contains more products on a shopping list assigned to this delivery associate, reroute a user to another store that contains more products on her shopping list, or prompt a user to remove or elect an alternate or backup product for her shopping list, as described below, responsive to reduction in availability of a product indicated on a shopping list assigned to this store.

However, the computer system can dispatch the robotic system to execute scan cycles according to any other fixed or dynamic schedule.

5.4 Scan Data Processing

Therefore, while autonomously navigating along a particular aisle in this set of aisles in the store, the robotic system can record a set of photographic images of a set of shelving structures facing the particular aisle. The robotic system can then upload these photographic images of inventory structures in the particular aisle to the computer system for remote processing, such as in real-time or upon conclusion of the scan cycle.

Figure 4:
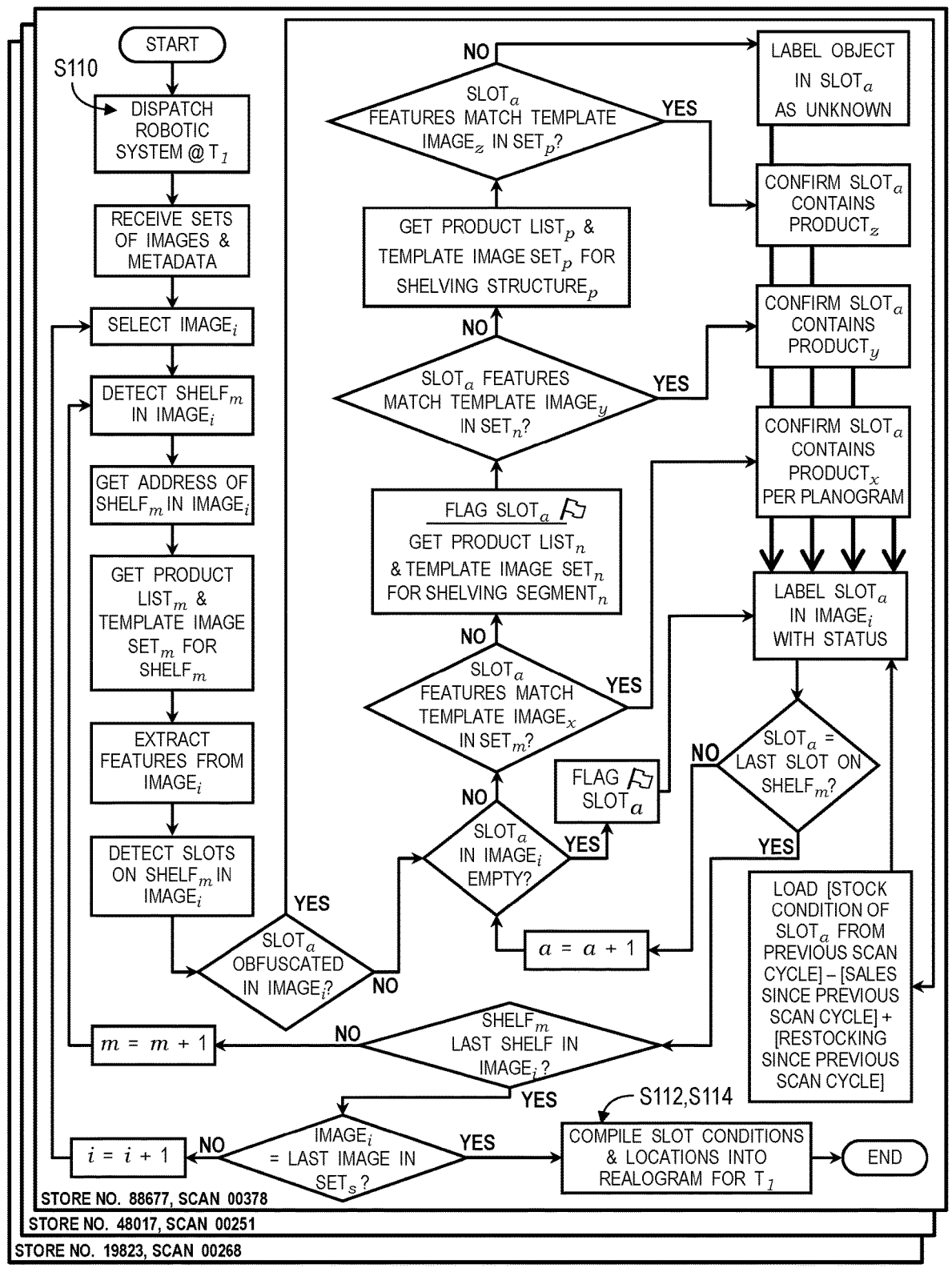
FIG. 4 is a flowchart representation of one variation of the method.

As shown in FIG. 4, the computer system can then: detect a first shelf in a first shelving structure in a first region of a first photographic image, in the set of photographic images, recorded at approximately the first time; identify an address of the first shelf; retrieve a first list of products assigned to the first shelf by a planogram of the store based on the address of the first shelf; retrieve a first set of template images from a database of template images, wherein each template image in the first set of template images depicts features of a product in the first list of products; extract a first set of features from the first region of the first photographic image; and determine that a unit of the first product is stocked on the first shelf in response to alignment between features in the first set of features and features in the first template image.

Alternatively, the computer system can determine that a unit of the first product is improperly stocked on the first shelf in response to deviation between features in the first set of features and features in the first template image. Then, in response to determining that the unit of the first product is improperly stocked on the first shelf, the computer system can generate a restocking prompt for the first product on the first shelf and serve this restocking prompt to an associate of the store in real-time. Alternatively, the computer system can: append a global restocking list for the store with a restocking prompt to restock the first product on the first shelf; and later serve this global restocking list to an associate of the store, such as upon conclusion of the scan cycle, as described in U.S. patent application Ser. No. 15/600,527.

The computer system can then log the stock condition of the first product on the first shelf (or in a particular slot on the first shelf), such as in a stock condition record for the store. The computer system can repeat this processes for each other slot, shelf, shelving segment, shelving structure, and/or other inventory structure depicted in scan data captured by the robotic system during this scan cycle, including: selectively generating and distributing restocking prompts for empty (and understocked) slots and shelves; and logging stock conditions of these products in their assigned slots or shelves.

The computer system can implement similar methods and techniques to track and log stock conditions of products in the store based on thermographic images, multi-spectral images, and RFID data collected by the robotic system during this scan cycle.

The computer system can then store this stock condition of the store for this scan cycle, such as in the form of a table or list: containing product identifiers paired with slot addresses (and unit quantity) for each product detected in scan data recorded during this scan cycle; and timestamped with a start time, end time, or time window of the scan cycle. However, the computer system can record the stock condition of the store—thus derived from scan data recorded by the robotic system during this scan cycle and timestamped according to this scan cycle—in any other format.

Furthermore, the computer system can repeat this process to generate subsequent, timestamped stock condition records for the store based on scan data recorded by the robotic system during the first scan cycle during later scan cycles.

5.5 Product Availability

Therefore, a last stock condition record thus generated by the computer system—based on scan data recorded by the robotic system during a last scan cycle at the store—may approximate availability of products throughout the store at the time of this last scan cycle. Following this scan cycle and before a next scan cycle at the store, the computer system can also: ingest product sales from a point-of-sale system at the store, such as in the form of product identifiers, product quantities, and times of sale events at the store; ingest product restocking data from a restocking system at the store, such as in the form of product identifiers, product quantities, and times of restocking events at the store; and update product quantities in the last stock condition record to reflect these sale and restocking events. More specifically, the computer system can update the last stock condition record of the store based on product sales and restocking data—accessed from these other services deployed in the store—such that this stock condition record approximates a true state of the store at any time after this last scan cycle.

The computer system can then reset this stock condition record based on product data extracted from scan data recorded by the robotic system during a next scan cycle. However, a subset of slots in the store may be obscured in scan data recorded during this next scan cycle—such as by patrons, temporary (e.g., cardboard) product displays, or boxes—such that these scan data omit information relevant to deriving stock conditions of this subset of slots. Therefore, the computer system can: continue to update stock condition of this subset of slots in the store based on product sales and restocking data accessed from point-of-sale and restocking services deployed in the store; and update the stock condition of other slots in the store based on scan data collected by the robotic system during this next scan cycle.

The computer system can therefore: store a stock condition for a particular slot thus derived from scan data—depicting the particular slot—recorded during a last scan cycle as a "ground truth" stock condition of this particular slot; decrement the stock condition for this particular slot based on sales of a product assigned to the particular slot thus derived from sale data following this last scan cycle; and increment the stock condition for this particular slot based on restocking data for this product following this last scan cycle. The computer system can then reset the stock condition for this particular slot based on a next set of scan data—captured during a subsequent scan cycle—that depicts this particular slot. The computer system can implement this process for each slot in the store and compile these slot-specific stock conditions for (many or all) slots in the store into one aggregate stock condition record for the store.

Alternatively, the computer system can store a stock condition for a particular slot thus derived from most-recent scan data depicting the particular slot as a "ground truth" stock condition of this particular slot and timestamp this stock condition for the particular slot with a time of the scan cycle in which these scan data were recorded. The computer system can repeat this process for each other slot in the store based on most-recent scan data depicting these slots in order to generate a corpus of stock conditions of individual slots labeled with timestamps for various past scan cycles. The computer system can then compile stock conditions of these individual slots into one aggregate stock condition record for the store.

For example, for a first product detected in scan data recorded by the particular robotic system during both a first scan cycle and a second, subsequent scan cycle, the computer system can: derive current availability of the first product based on scan data recorded during the second scan cycle; and store this availability of the first product—in a current stock condition record of the store—with a timestamp for the second scan cycle. However, for a second product detected in scan data recorded by the particular robotic system during the first scan cycle but obscured in scan data recorded by the particular robotic system during the second scan cycle, the computer system can: retrieve past availability of the second product derived from scan data recorded during the first scan cycle; and store this past availability of the second product—in the current stock condition record of the store—with a timestamp for the first scan cycle. Later, the computer system can serve these timestamps or time since last confirmed availability of products in the store to a customer portal. A user at the customer portal may then interpret these timestamps or time spans as measures of confidence or accuracy of indicated availability of these products in the store.

However, the computer system can implement any other method or technique to track and store availability of products in the store over time.

5.5 Product Location Tracking

Similarly, because a subset of slots in the store may be obscured from the robotic system during a scan cycle, the computer system can aggregate product locations derived from scan data collected over multiple scan cycles into one product location map (or "realogram") of the store that represents true locations of (substantially, nearly) all products in the store. In particular, the computer system can aggregate stock conditions of the store derived from scan data recorded during multiple consecutive scan cycles—such as four scan cycles over a period of 48 hours—to generate a product location map that identifies locations of substantially all products in the store. For example, the computer system can: calculate a union of product locations derived from scan data recorded during the last four scan cycle; and store this union in the form of a product location map or realogram that represents true locations of products throughout the store.

The computer system can then leverage this realogram to aggregate a list of locations or addresses of products contained in a shopping list and/or to define a route—through the store—to each product contained in a shopping list, as described below.

5.6 Other Stores

The computer system can implement similar methods and techniques: to queue robotic systems—deployed to other stores in the same geographic region—to execute scan cycles in their corresponding stores; to derive stock conditions of slots throughout these stores based on scan data collected by these robotic systems; and to maintain current stock condition records for these stores over time based on new inbound scan data, sales data, and/or restocking data.

6. Shopping List Generation

Block S120 of the method S100 recites initiating a virtual shopping list at a computing device for a user within the geographic region. Generally, in Block S120, the computer system can interface with a user—such as through a customer portal within a native application or web browser executing on the user's computing device (e.g., a smartphone, a desktop computer)—to initiate a shopping list, such as for subsequent: fulfillment and delivery by a delivery service; fulfillment and delivery by a store; fulfillment by a store and in-store pickup by the user; or fulfillment by the user upon subsequent arrival at the store.

6.1 Virtual Browsing

In one implementation shown in FIG. 1, the computer system prompts the user to select her preferred store, such as from a list of stores near the geospatial location of the user's mobile computing device, through the customer portal executing on the user's computing device. The computer system then retrieves most-recent images of shelving structures (and other inventory structures) throughout the selected store, such as 2D composite panoramic photographic images—generated by compiling groups of consecutive color images captured by the robotic system during a last scan cycle at the store—and tagged with product identifiers (e.g., SKU values) of products represented in these panoramic photographic images. Alternately, the computer system can serve 3D virtual representations of these shelving structures—generated from scan data recorded by the robotic system during the last scan cycle—to the customer portal. The computer system can render these images within the customer portal, such as in a virtual reality environment within the customer portal, and can scroll along and through these images responsive to user input, thereby enabling the user to virtually "walk through" or "browse" aisles in the store. The computer system can also receive a product or product category selection from the user and selectively serve a composite or virtual image of a shelving structure containing this product or product category to the user, thereby enabling the user to view this product or product category in the context of other related products currently stocked in the store.

When the user circles or selects a tagged region of a composite image rendered in the customer portal, the customer portal can open a window, popup, or second webpage, etc. containing product information and an option to select a quantity of units of the selected product to add to the shopping list.

In a similar implementation, the computer system can: access a set of photographic images recorded by the particular robotic system while autonomously scanning shelving structures within a store during a last scan cycle; and fuse groups of photographic images—in this set of photographs—into a set of panoramic photographic images, wherein each panoramic photographic image depicts a complete, individual shelving structure in the store. When the user enters a search term for a particular product, product category, or aisle in the store at the customer portal, the remote computer system can: retrieve a particular panoramic photographic image—in this set of panoramic photographic images—depicting the shelving structure containing the corresponding product, depicting the corresponding product category, or facing the corresponding aisle; and serve this panoramic photographic image to the computing device for rendering within the customer portal. Then in response to receiving selection of a pixel in this panoramic photographic image, the remote computer system (or the computer system) can identify a particular product depicted by this pixel, record selection of this particular product, and implement methods and techniques described below to selectively append the shopping list with an identifier of the product and/or filter stores that are currently (likely to be) stocked with all products on this shopping list. As the user continues to virtually browse this store, the remote computer system can repeat this process to serve panoramic photographic images of other shelving structures in the store to the customer portal and to append other products to the shopping list based on pixel selections entered by the user.

Thus, when a particular product represented in the composite image is selected by the user at the customer portal, the computer system can add an identifier of the particular product—and an indicated quantity of this particular product—to the user's shopping list. The computer system can also repeat the foregoing methods and techniques to append additional products—corresponding to other regions of other composite (or virtual) images selected by the user at the customer portal—to the shopping list.

Therefore, the computer system can serve photographs of shelving structures in the store—recorded recently by the robotic system while autonomously navigating throughout the store during a scan cycle—to the customer portal in order to enable the user to view the current state of shelves in the store (e.g., with a latency of mere minutes or up to several hours since a last scan cycle at the store) and to populate a shopping list by selecting products depicted in these images. Alternatively, the remote computer system can generate virtual representations of shelving structures in the store based on these photographic images recorded by the robotic system during a scan cycle—such as virtual planograms or realograms of these shelving structures—and serve these virtual representations of shelving structures to the customer portal and record individual products selected from these virtual representations to the user's shopping list.

However, the remote computer system can implement any other method or technique to present products available in a store to the user and to record product selections entered by the user at the customer portal.

6.2 Live Search

One variation of the method S100 shown in FIG. 5 includes: Block S122, which recites, in response to receipt of selection of a product at the computing device, isolating a subset of stores, in the set of stores, corresponding to current stock conditions including the product and a preceding set of products in the virtual shopping list; and Block S124, which recites, in response to the subset of stores including at least one store, appending the product to the virtual shopping list. Generally, in Blocks S122 and S124, the computer system can leverage current stock conditions of stores near the user to identity a store—in this set—that is currently stocked with all products in the user's shopping list as the user builds her shopping list.

In one implementation, in response to the user entering her location and a search term for a first product into the customer portal, the computer system: identifies a set of stores near (e.g., with five miles or fifteen minutes of) the user's current location (or within a threshold time or distance of a drop-off location specified by the user); retrieves current stock conditions of stores in this set; and identifies a first subset of stores in the set that are currently stocked with the first product according to their current stock conditions. If this first subset of stores is not null, the computer system can then enable the user to add the first product to her shopping list, such as up to a maximum number of units of the first product present in any store in the first set of stores. Once the user elects to add a quantity of the first product to her shopping list and enters a search for a second product, the computer system can identify a second subset of stores—in the first set of stores—that are currently stocked with both the first quantity of the first product and at least one unit of the second product based on current stock conditions of these stores. If the second subset of stores is not null, the computer system can enable the user to add the second product to her shopping list—currently including the first product—such as up to the maximum number of units of the second product present in any store in this second set of stores.

However, if the second subset of stores is null, the computer system can: indicate to the user that the first and second products are both unavailable in any store in her vicinity; prompt the user to select either of the first and second products; or prompt the user to confirm a surcharge for delivery of products from two different stores. For example, if the user confirms delivery of product from two different stores, the computer system can activate two distinct shopping lists for the user, including: a first shopping list for nearby stores that are currently stocked with the first product; and a second shopping list for nearby stores that are currently stocked with the second product. More specifically, in response to receipt of selection of a second product—from a population of products stocked in stores in the geographic region—by the user, the remote computer system can filter the set of stores within the geographic region to isolate a second subset of stores associated with current stock conditions indicating presence of this second product. If this second subset of stores excludes a particular store designated for fulfillment of other products previously added to the shopping list, the remote computer system can prompt the user to confirm fulfillment of the shopping list by multiple stores. If the user confirms multi-store fulfillment, the remote computer system can segment the shopping list into: a first shopping list segment containing identifiers of products previously added to the shopping list and designated for fulfillment by the first store; and a second shopping list segment containing a second identifier of this second product just added to the shopping list and designated for fulfillment by a second store in the second subset of stores.

Alternatively, the computer system can scan current stock conditions of stores in the first set of stores for a third product in the same product category as the second product or otherwise comparable to the second product and prompt the user to elect the third product rather than the second product such that all products on the shopping list are (likely to be) present in at least one store in the geographic region (e.g., the user's preferred store or a particular store nearest the current location of the user's computing device).

In another implementation, when the user adds a next product to her shopping list, the computer system can query current stock conditions of stores in the geographic region for a subset of stores that are currently stocked with this next product and products previously added to the shopping list. If addition of this next product reduces a total number of stores at which this shopping list may be fulfilled in its entirety, the computer system can: identify an alternate, comparable product that is available at a greater number of these stores (e.g., an alternate product in the same product category and/or stocked in a slot adjacent this next product in one or more of these stores); proactively serve a suggestion to the user to replace the next product with this alternate, comparable product on the shopping list; and replace the next product with this alternate product on the shopping list or write this alternate product as a backup (or "replace with") product for the next product on the shopping list.

In another implementation in which the user elects to fulfill the shopping list personally rather than via delivery by a delivery associate, the remote computer system can record the user's preferred store. As the user selects products—from a union of current stock conditions of these stores—to add to her shopping list, the remote computer system can verify that all products selected by the user are available at the user's preferred store. If the user selects a product not available at the user's preferred store, the remote computer system can: prompt the user to elect an alternate product; or confirm fulfillment of the shopping list at an alternate store associated with a current stock condition that does indicate presence of all products on the shopping list. For example, in response to selection of a next product, from a population of products available at stores within the geographic region, from the user, the remote computer system can: filter the set of stores within the geographic region to isolate a subset of stores associated with current stock conditions identifying presence of the next product and products previously added to the virtual shopping list; and add an identifier of this next product to the virtual shopping list if this subset of stores includes at least one store. However, if the current stock condition of the user's preferred store indicates absence of this next product, the remote computer system can: identify a second store—in the subset of stores—for fulfillment of all products on the virtual shopping list; serve a prompt to the user to confirm this second store; and only add the second product to the shopping list if the user confirms this second store.

Similarly, if the user's preferred store is not currently stocked with a next product added to the user's shopping list, the computer system can automatically identify an alternate, comparable product and serve a suggestion to the user to replace the next product with this alternate, comparable product in order to increase probability that all products on the user's final shopping list are available at this store when the user later arrives at the store to personally fulfill this shopping list. Therefore, the remote computer system can selectively prompt the user to elect alternate products or save backup products for specific products not currently stocked at a store nearby or unlikely to be stocked in this store during fulfillment of the user's shopping list.

The computer system can repeat the foregoing process for each additional product or product category selected by the user until the user confirms the shopping list. The computer system can thus interface with the user to generate a shopping list specifying a set of products that are all currently in stock (or likely to be in stock) in at least one store near the user at the time the shopping list is created in Blocks S122 and S124. However, the remote computer system can implement any other method or technique to filter stores for fulfillment of the user's shopping list, filter products available to add to the shopping list, and/or recommend alternate products to the user as the user adds products to her shopping list in order to achieve a high probability that at least one store near the user is stocked with all products on the user's shopping list at time of submission of the shopping list and/or at time of first fulfillment of the shopping list.

7. Store Selection

Upon completion and submission of the shopping list, the remote computer system can select a particular store for fulfillment of the shopping list in Block S140. For example, if more than one store in the geographic region is associated with current stock conditions that indicate availability of all products on the user's shopping list and if the user has elected delivery of products on her shopping list, the remote computer system can select a particular store—from this set of stores—nearest the user's specified delivery location. Alternatively, the remote computer system can assign the shopping list to a delivery associate dispatched to a particular store—in this set of stores—to fulfill another shopping list designating another delivery location near the user's delivery location and thus allocate the user's shopping list to this particular store.

Alternatively, if more than one store in the geographic region is associated with current stock conditions that indicate availability of all products on the user's shopping list and if the user elects to personally fulfill her shopping list, the remote computer system can prompt the user—via the customer portal—to manually elect a particular store, in this set of stores, at which to fulfill the shopping list. The remote computer system can then annotate product identifiers on the shopping list with their locations or slot addresses in the particular store and/or generate a route through the particular store to the location of each product on the shopping list, as described below. Therefore, in this implementation, the remote computer system can prompt the user to select from a subset of stores stocked with all products on her shopping list after (rather than before) completing the shopping list; the remote computer system can then record selection of a particular store by the user and selectively serve guidance to the user to streamline her subsequent visit to the particular store to fulfill this shopping list.

8. Delivery Dispatch

Block S130 of the method S100 recites dispatching a delivery associate to a particular store, in the subset of stores, to fulfill the virtual shopping list. Generally, in Block S130, the computer system can interface with the user to finalize and submit the shopping list and then link the shopping list to a particular store near the user that—according to a recent stock condition of the store—is stocked with all products on the final shopping list.

In one implementation, the computer system links the shopping list to the particular store and then serves the shopping list to the delivery service for fulfillment; the delivery service can then assign the shopping list to a delivery associate and dispatch the delivery associate to the particular store.

Alternatively, the computer system can: serve the shopping list directly to the delivery associate; serve the shopping list to the particular store for fulfillment by an associate of the particular store; or store the shopping list for the user until the user arrives at the particular store to fulfill the shopping list herself, as described below.

8.1 Real-Time Shopping List Adjustment

As fixed or mobile sensors in these stores collect additional scan data, the computer system can recheck availability of products and product quantities specified in the user's shopping list—such as up until a time that individual products on the shopping list are picked by a delivery associate—and selectively prompt the user to remove or modify products on her shopping list responsive to new out-of-stock conditions detected in the store thus elected for fulfillment of the shopping list, as shown in FIG. 5.

In one implementation, if the computer system determines from scan data collected by fixed or mobile sensors in the particular store—after submission of the shopping list and before fulfillment of the shopping list by the delivery associate—that a particular product on the shopping list is no longer available in the particular store, the computer system can prompt the user to: modify a quantity of the particular product on the shopping list; remove the particular product from the shopping list; or move the particular product to a second shopping list for a second store nearby if recent scan data for the second store indicates that the particular product is available in sufficient quantity at the second store. Alternatively, the computer system can serve a prompt to the user to replace the particular product in the virtual shopping list with an alternative product in Block S140, such as prior to the delivery associate arriving at the particular store. For example, the computer system can: serve this prompt to the user in real-time through the customer portal (e.g., in the native application or web browser executing on the user's computing device) while the user is populating the shopping list; or push a SMS text message or other electronic notification containing this prompt to the user's computing device between submission of the shopping list by the user and fulfillment of the shopping list by a store or delivery associate.

For example, upon submission of the shopping list, the remote computer system can assign the shopping list to a delivery associate and dispatch the delivery associate to the particular store to fulfill the shopping list. During a period of time between submission of the shopping list and arrival of the delivery associate at the particular store, the remote computer system can: dispatch a robotic system, deployed in the particular store, to autonomously scan shelving structures within the particular store; and updating a current stock condition of the particular store based on scan data recorded by the robotic system during the first scan cycle. Then, if the current stock condition of the particular store identifies absence of a particular product in the virtual shopping list prior to fulfillment of the virtual shopping list by the delivery associate, the remote computer system can serve a prompt to the user's computing device to replace the particular product with an alternate product identified as present by the current stock condition of the particular store. In this example, the remote computer system can also: serve to the computing device a photographic image of a shelving structure—in the particular store—containing a slot assigned to the particular product but now omitting units to the particular product; and serve a prompt to the computing device to replace the particular product on the virtual shopping list with an alternate product depicted in this photographic image, such as by selecting this particular product directly from this photographic image.

The computer system can thus proactively inform the user of a change in availability of the particular product and automatically prompt the user to modify the shopping list accordingly—and without supervision or management by the delivery associate or other delivery manager upon arrival at the particular store, which may significantly improve efficiency of the delivery service. Furthermore, the remote computer system can implement these methods and techniques to selectively poll the user for selection of an alternate product when an updated stock condition of a store—previously selected for fulfillment of the shopping list—indicates that a product on the shopping list is no longer available at the store, thereby eliminating a burden for the user to elect backup products during creation of the shopping list while also providing the user opportunity to verify that all of her needs are met by this shopping list even as product availability of the store changes. (The computer system can implement similar methods and techniques to automatically manage the shopping list submitted by the user for fulfillment (and delivery) by the particular store.)

8.2 Shopping List Rerouting

Additionally or alternatively, if new scan data collected by fixed or mobile sensors in the particular store—selected for fulfillment of the shopping list—now indicate that a particular product on the shopping list is not available at the particular store and if a delivery associate assigned to the shopping list has not yet arrived at the particular store, the computer system can scan current stock conditions of other stores nearby for availability of all products on the shopping list. If the computer system thus identifies a second store currently stocked with all (or more) products on the shopping list, the computer system can reassign the shopping list to this second store and prompt the delivery service to dispatch the delivery associate to this second store for fulfillment of the shopping list or reassign the shopping list to a different delivery associate at or en route to this second store. (The computer system can similarly interface with the delivery service to dispatch the delivery associate to the second store if the computer system determines from scan data—recorded by fixed and/or mobile sensors in the particular state—that customer traffic is greater or check out lines are longer than typical or in excess of those at the second store.)

Similarly, in the variation described below in which the user generates the shopping list in preparation for personal in-store shopping, if the computer system determines that a particular product on the shopping list is no longer stocked in the store selected by the user and if the user has not yet arrived at this store, the computer system can: scan current scan data for other stores nearby to identify a second store that is stocked with the particular product; and prompt the user to alternatively shop at this second store to fulfill her pending shopping list. If confirmed by the user, the remote computer system can update locations of products on the shopping list to reflect locations of these products in the second store and/or regenerate a route through last detected locations of these products in the second store.

9. Click and Fulfillment: Delivery Associate Routing

Once the user confirms the shopping list and once the shopping list is assigned to a delivery associate, the computer system can calculate a route through the particular store for retrieval of each product on the shopping list based on a current realogram of the store (e.g., based on most-recent scan data recorded by fixed and/or mobile sensors in the store). In particular, the computer system can leverage a realogram or other representation of actual locations of aisles, counters, entrances, and exits within the store, current locations of product, and current product quantities (and current customer traffic) throughout the store to calculate an efficient route through the store for the delivery associate.

In one implementation, the computer system: retrieves a newest realogram of the store (or other current form of the current stock condition of the store); defines a waypoint—such as in a coordinate system defined within the store—adjacent the location of each product indicated on the shopping list based on locations of these products recorded in the current realogram; and then calculates a route from an entrance of the store, through these waypoints, to a check out aisle (if applicable for the store), and up to an exit of the store. For example, the computer system can implement a cost function to calculate a route that: intersects at least one waypoint adjacent a known location of each product on the shopping list; minimizes a length of the route; and/or minimizes an estimated duration of time to complete the route by avoiding crowded or obstructed aisles, such as based on a current occupancy distribution and locations of spill in the store, as derived from scan data recently collected by fixed and/or mobile sensors in the store.

Furthermore, if the shopping list specifies a quantity of a particular product that exceeds the quantity of this particular product in any one location (e.g., slot, shelving segment, or aisle) in the store, the computer system can define multiple waypoints for this particular product, including one waypoint at each location that this particular product is currently available in the store up to the quantity of this particular product specified on the shopping list. The remote computer system can repeat this process for each other product on the shopping list and calculate a shortest route through each of these waypoints; and then serve this route to the delivery associate's mobile device, such as once this mobile device enters a geofenced area around the store.

The computer system can then serve this route to the delivery associate, such as through a delivery portal accessed by the delivery associate through her mobile computing device. (The computer system can implement similar methods and techniques to generate a route for the shopping list designed for fulfillment by the store itself and can serve this route to an associate of the store accordingly.)

9.1 Real-Time Re-Routing

Therefore, the remote computer system can: dispatch a delivery associate to a store to fulfill the user's shopping list; calculate a route through the particular store to a last detected location of each product on the shopping list based on a current stock condition of the particular store and a map (e.g., a realogram, and planogram) of the store; and then serve this route to a mobile device affiliated with the delivery associate, such as when the delivery associate arrives at the store. Once inside the store, the delivery associate may arrive at an indicated location of a particular product on the shopping list but find that this particular product is no longer available at this location. The delivery associate may then indicate—in the delivery portal—absence of the particular product at this location. Accordingly, the remote computer system can: scan the current stock condition of the store for a set of other locations in the store at which the particular product is (estimated to be) available; select an alternate location—from this set—that is nearest the delivery associate or nearest the remaining route previously calculated for this shopping list; and recalculate this route to intersect this alternate location. The remote computer system can then serve a prompt to the delivery associate—via the delivery portal—to move to a next location on the route and to collect the particular product at a subsequent location along the route during this fulfillment cycle.

Therefore, the remote computer system can serve real-time guidance to the delivery associate regarding alternate locations in the store for products on the shopping list in order to decrease deviations between the shopping list and a basket populated by the delivery associate during this fulfillment cycle.

10. Direct to Shopper

In one variation as shown in FIG. 5, the computer system serves similar support and functionality direction to a user preparing to personally fulfill her shopping list.

10.1 User Profile

In this variation, the computer system can store a profile of the user, such as populated with the user's shopping preferences and history. For example, through the customer portal, the user can set a geographic boundary in which she is willing to travel to shop, such as by entering a zip code and distance, defining a polygonal boundary around a geographic region, or manually drawing this geographic region over a digital map rendered in the customer portal. The customer portal can additionally or alternatively prompt the user to select a primary store, to select one or more secondary stores, and to set a maximum distance from a primary store she is willing to travel for products out-of-stock in the primary store. Furthermore, the customer portal can prompt the user to specify one or more franchises at which she is willing or prefers to shop. The computer system can store these preferences in the user's profile.

10.2 Initial Shopping List

In this variation, the computer system can automatically generate a prospective shopping list for the user, such as when the user opens the customer portal on her smartphone and/or when her smartphone physically enters a geofenced area around her primary store. For example, the computer system can retrieve a last shopping list submitted by the user for the primary store and present this last shopping list to the user—via the customer portal—as a prospective shopping list. In another example, the computer system can: retrieve multiple past shopping lists submitted by the user for the primary store, for other stores in the same franchise, and/or for other stores in the same geographic region; and compiles identifiers or descriptions of products in these shopping lists into a prospective shopping list. In yet another example, the computer system can: extract types and quantities of products—previously purchased by the user at the same store, other stores in the same franchise, or other stores in the same geographic region—from electronic receipts sent to a user (e.g., to the user's email or SMS text message account) and/or from receipts scanned into a user's mobile computing device; and then compile identifiers or descriptions of these products into a prospective shopping list.

The computer system can then predict relevancy of these products for the user's current shopping trip at the store, such as based on a frequency with which the user purchased these products historically and weighted as a function of how recently the user purchased these products. In another example, the computer system can extract purchase trends for products or product categories previously purchased by the user (e.g., orange juice once per week; toilet paper once per month); and rank each product on the prospective shopping list by proximity of the current date to a purchase time for the product or product category predicted by the user's purchase trend for this product.

The computer system can serve this prospective shopping list—including products ranked by predicted relevancy—to the user through the customer portal. The computer system can then prompt the user to: confirm or discard products from the prospective shopping list; add omitted products to the prospective shopping list (e.g., via a product search function within the native application or by viewing current composite images of shelving structures in the primary store, as described above); adjust quantities of these products on the shopping list; and then confirm the shopping list through the customer portal.

Alternatively, the computer system can interface with the user via the customer portal as described above to build a shopping list for an upcoming shopping trip by the user, and the computer system can retrieve this shopping list when the user reopens the customer portal on her smartphone and/or when her smartphone physically enters a geofenced area around her primary store. However, the computer system can implement any other method or technique to opportunistically retrieve and/or generate a shopping list for the user, such as when the user nears a primary (or secondary) store noted in her profile.

10.3 Product Availability Checks

As described above, the computer system can also retrieve a stock condition of the store—generated nearest the user's arrival at or near the store—and filter products on the prospective shopping list based on whether these products are currently available in the store. In one implementation, the computer system filters the prospective shopping list to remove products not currently available in the store before serving the prospective shopping list to the user. In another implementation, the computer system serves the prospective shopping list to the user, such as ranked by predicted relevance; indicates known quantities of these products that are currently in stock in the store; and enables the user to select a quantity of each product on the prospective shopping list up to the quantities of these products that are currently in stock in the store.

Furthermore, between confirmation of the shopping list and the user's entry into the store (or between confirmation of the shopping list and arrival of the user's mobile computing device at a location of a particular product on the shopping list), the computer system can: continue to monitor scan data recorded by the fixed and/or mobile sensors in the store for changes in availability of products on the shopping list. For example, the computer system can selectively inform the user if a particular product that was previously available becomes out-of-stock or if a particular product that was previously out-of-stock becomes available.

In another implementation, if the user (e.g., the user's mobile computing device) is not currently located inside a store or within a threshold distance of the store linked to the shopping list and if the computer system determines that a particular product contained on the shopping list is now no longer available in the store based on new scan data recorded by fixed and/or mobile sensors in the store, the computer system can scan other current scan data (e.g., a current realogram) of other stores nearby (e.g., other stores listed in the user's profile or that fulfill preferences recorded in the user's profile) for availability of the particular product. If the computer system then identifies a second store currently stocked with more or all products on the shopping list, the computer system can prompt the user to reroute to the second store for fulfillment of the shopping list.

Similarly, after submission of a shopping list and selection of a particular store by the user, the remote computer system can dispatch a robotic system to autonomously scan shelving structures within the particular store and then update a current stock condition of the particular store based on scan data recorded by the particular robotic system during this scan cycle. If the current stock condition of the particular store now excludes a particular product on the user's shopping list prior to arrival of the user at the particular store, the remote computer system can serve a prompt to the user's computing device: to delay arrival at the particular store until after a next restocking event; to elect an alternative store—in a subset of stores in which more or all products on the user's shopping list are currently available—for fulfillment of the shopping list; or to instead elect fulfillment of the shopping list by a delivery associate dispatched to this alternative store.

In yet another implementation, if the user (e.g., the user's mobile computing device) is not currently located inside the primary store linked to the shopping list or within a threshold distance of the primary store, the computer system can implement the foregoing methods and techniques to: recalculate a current stock condition of the primary store based on new scan data collected by mobile and/or fixed sensors deployed in the primary store; and then recheck the current stock condition of the primary store against the shopping list to determine whether a threshold proportion (e.g., 95%, 100%) of products on the shopping list are currently available in the primary store. Once more than the threshold proportion of products on the shopping list is confirmed in the primary store, the computer system can serve a notification to the user to depart for the primary store. (The computer system can similarly check current stocks states of other secondary stores nearby to determine whether a threshold portion of products on the shopping list are currently available in any of these secondary stores and selectively prompt the user to shop at a particular secondary store once more than the threshold proportion of products on the shopping list is confirmed as present in particular secondary store.)

10.4 In-Store Route

The computer system can also: implement methods and techniques described above to generate a route inside the store—linked to the shopping list—for retrieving each product on the shopping list; and then serve this route to the user via the customer portal, such as when the user's mobile computing device enters the store or enters a georeferenced boundary defined around the store.

For example, if the user populates and finalizes the shopping list before arriving at the store, the remote computer system can: retrieve a current stock condition of the store generated based on scan data collected by the robotic system during one or more preceding scan cycles; extract both location and presence of products—on the user's shopping list—in the store from this current stock condition; calculate a shortest route through the store that intersects at least one location in which a product is indicated as present by the current stock condition for each product on the shopping list; and return this route—such as overlayed on a 2D map of the store—to the customer portal in near real-time. Between completion of the shopping list and arrival of the user at the store, the remote computer system can implement methods and techniques described above to track stock conditions in the store and update the stock condition of the store accordingly, such as based on additional scan data recorded by the robotic system during subsequent scan cycles, point-of-sale data, and/or restocking data. Upon arrival of the user at the store, the remote computer system can then recalculate the route for products on the user's shopping list based on the current stock condition of the store and then serve this updated route to the user's computing device.

10.5 Real-Time Product Query and Location

In this variation, the computer system can also inform the user regarding availability of a particular product and its location(s) in a store in real-time while the user is present and shopping in the store. For example, while in the store, the user may enter a query for a particular product into a search bar in the customer portal at her mobile computing device. Upon receipt of this query, the computer system can: scan the current realogram of the store to determine locations of the particular product and a quantity of the particular product at each location in the store; access a map of the store (e.g., a plan view of the planogram or realogram of the store, a plan view of a 3D map of the store generated by the mobile robotic system operating in the store); annotate the map with a pin and a quantity caption at each location of the particular product; and serve the annotated map to the user via the customer portal—in real-time—in order to visually indicate to the user where and how much of the particular product is present in the store.

In another example in which the user populates the shopping list at the customer portal executing on her computing device while present in the store, the remote computer system can: retrieve a current stock condition of the store; serve a list of products, a realogram, or images of inventory structures in the store to the customer portal; and record selections of products by the user. When the user selects a next product, the remote computer system can: query the current stock condition of the store for locations of slots containing units of this product; (re)calculate a (shortest) route from the current location of the computing device though one location of every product currently on the shopping list; and serve this route to the computing device for rendering—in near real-time—within the customer portal.

However, the computer system can implement any other method or technique to indicate to the user where and in what quantities a particular product or product category are currently present in the store based on current scan data recorded by fixed and/or mobile sensors deployed in the store.

In one variation, the native application (or web browser) executing on the user's computing device can implement interior localization techniques to track its location as the user moves throughout the store. For example, the native application can communicate with beacons placed at known locations throughout the store to estimate the position of the mobile computing device. In another example, the native application can triangulate its location in the store based on communications with Wi-Fi routers and hotspots at known locations within the store. In yet another example, the native application: accesses the store map generated by the robotic system during a last scan cycle in the store; and maps 2D or 3D optical data—recorded through an optical sensor in the mobile computing device as the user moves through the store—to features in the robotic system-generated store map in order to localize the mobile computing device within the store. In this example, the native application can thus leverage knowledge of the interior of the store recently generated by the robotic system and stored in a current store map in order to localize the user within the store.

In this variation, the native application can also access the realogram recently generated by the robotic system and can render a subregion of this realogram—corresponding to the user's current location or corresponding to the location of a next product on the user's shopping list—on the display of the mobile computing device, such as in the form of a 2D plan, 2D elevation, or 3D image of the corresponding subregion of the realogram. The native application can also highlight products in this rendered subregion of the realogram in order to indicate to the user—such as in an augmented reality environment—where products on the user's shopping list are located near her currently location without necessitating complicated processing-intensive computations at the mobile computing device to overlay augmented reality content on video feed recorded by the mobile computing device. The native application can thus: selectively present realogram data generated by the robotic system during a last scan cycle to the user through the customer portal; and annotate these realogram data based on the user's location and the user's shopping list in order to enable the user to complete her shopping list in less time and with less hassle (e.g., with less searching).

11. Closed-Loop Restocking Prompts

In one variation, the computer system serves restocking prompts to store associates based on the current stock condition of the store and real-time product demand indicated by pending shopping lists specifying the store. Generally, the computer system can generate a list of slots in the store that are out-of-stock or understocked based on scan data recorded by fixed and/or mobile sensors deployed in the store, such as described in U.S. patent application Ser. Nos. 15/347,689 and 15/600,527. However, in this variation, the computer system can also aggregate pending shopping lists associated with the store, such as including: pending shopping lists assigned to delivery associates en route to the store; pending shopping lists assigned to delivery associates currently occupying the store; and pending shopping lists designated for fulfillment by users. The computer system can then: compile a set of products and quantities of these products specified in these shopping lists; reference this set of products and quantities against the current realogram of the store to identify a first subset of in-demand products that are currently out-of-stock; and reference this set of products and quantities against the current realogram of the store to identify a second subset of products for which quantities currently stocked on shelves in the store are insufficient to fulfill these pending shopping lists.

Because sale of products in the first and second subsets are highly likely, the computer system can then prioritize restocking of these products over other under-stocked and out-of-stock products in the store. In one example, the computer system: serves prompts to restock the first subset of products to store associates (e.g., in the form of electronic notifications served to computing devices affiliated with store associates or in the form of a master restocking list served to a manager of the store); and then serves prompts to restock the second subset of products to store associates once the first set of prompts have been closed. In another example, the computer system can: quantify or qualify demand for products in the first and second subsets of products as a function of frequency that these products appear in the set of shopping lists; weight these products by demand and margin for the store (e.g., as described in U.S. patent application Ser. No. 15/347,689); and then serve prompts to restock these products to store associates in order of product weight.

Once a store associate or manager confirms that a particular product has been restocked or once fixed or mobile sensors in the store detect and confirm that the particular product has been restocked, the computer system can also push a restock update to mobile computing devices of delivery associates and/or users—associated with pending shopping lists specifying the particular products—in (near) real-time to indicate that the particular product is now available in the store. For these delivery associates and users who are currently occupying the store, the computer system can also update in-store routes provided to these delivery associates and users to reflect new availability of the particular product.

However, the computer system can implement any other methods or techniques to selectively prompt a store associate to restock select out-of-stock and under-stocked products in the store based on real-time product demand predictions derived from pending shopping lists of patrons of the store.

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for managing virtual shopping lists comprising:
   during a first period of time, for each store in a set of stores within a geographic region:
      dispatching a robotic system, deployed in the store, to autonomously scan inventory structures within the store during a first scan cycle; and
      deriving a current stock condition of the store based on scan data recorded by the robotic system during the first scan cycle;
   during a second period of time succeeding the first period of time:
      initializing a virtual shopping list for a user at a computing device within the geographic region;
      in response to receipt of selection of a first product, from a population of products, at the computing device:
         isolating a subset of stores, in the set of stores, associated with current stock conditions indicating presence of the first product and products previously added to the virtual shopping list; and
         in response to the subset of stores comprising at least one store, adding a first identifier of the first product to the virtual shopping list; and
      specifying a particular store, in the subset of stores, for fulfillment of a set of products on the virtual shopping list;
   tracking a demand for the first product in the geographic region based on frequency of virtual shopping lists originating within the geographic region and containing the first identifier of the first product;
   in response to the demand for the first product within the geographic region exceeding a threshold demand during a third period of time succeeding the second period of time, dispatching the particular robotic system, deployed in the particular store, to autonomously capture a set of images of inventory structures comprising a set of slots assigned to the first product within the particular store;
   scanning the set of images for presence of the first product in each slot in the set of slots assigned to the first product within the particular store; and
   updating a particular current stock condition of the particular store, for the third period of time, to reflect presence of the first product in the set of slots detected in the set of images.

2. The method of claim 1, further comprising:
in response to receipt of selection of a second product, from the population of products, at the computing device:
filtering the set of stores within the geographic region to isolate a second subset of stores associated with current stock conditions indicating presence of the second product; and
in response to the second subset of stores comprising at least one store, adding a second identifier of the second product to the virtual shopping list; and
in response to a particular current stock condition of the particular store indicating absence of the second product, identifying a second store, in the second subset of stores, for fulfillment of the virtual shopping list.

3. The method of claim 1, further comprising:
in response to receipt of selection of a second product, from the population of products, at the computing device, filtering the set of stores within the geographic region to isolate a second subset of stores associated with current stock conditions indicating presence of the second product and products previously added to the virtual shopping list;
in response to the second subset of stores excluding the particular store, prompting the user to confirm fulfillment of the shopping list by multiple stores in the set of stores in the geographic region; and
in response to receipt of confirmation from the user, segmenting the shopping list into:
a first shopping list segment comprising the first identifier of the first product and designated for fulfillment by the first store; and
a second shopping list segment comprising a second identifier of the second product and designated for fulfillment by a second store in the second subset of stores.

4. The method of claim 1, further comprising:
calculating a first union of in-stock products in the set of stores in the geographic region;
receiving selection of the first product from the first union of in-stock products in the set of stores;
in response to receipt of selection of the first product from the first union of in-stock products in the set of stores, calculating a second union of in-stock products in the subset of stores; and
prompting the user to select a second product, from the second union of in-stock products in the subset of stores, to add to the shopping list.

5. The method of claim 1, further comprising:
dispatching a delivery associate to the particular store to fulfill the virtual shopping list;
during a third period of time succeeding the second period of time:
dispatching a particular robotic system, deployed in the particular store, to autonomously scan inventory structures within the particular store during a third scan cycle; and
updating a particular current stock condition of the particular store for the third period of time based on scan data recorded by the particular robotic system during the third scan cycle; and
in response to the particular current stock condition of the particular store indicating absence of a particular product in the virtual shopping list prior to fulfillment of the virtual shopping list by the delivery associate, serving a prompt to the computing device to replace the particular product on the virtual shopping list with an alternate product identified as present by the particular current stock condition of the particular store.

6. The method of claim 1, further comprising:
dispatching a delivery associate to the particular store to fulfill the virtual shopping list;
based on a particular current stock condition of the particular store and a map of the store, calculating a route through the particular store to a last detected location of each product in the virtual shopping list; and
serving the route to a mobile device affiliated with the delivery associate.

7. The method of claim 6, wherein calculating the route through the particular store comprises:
accessing a first location in the particular store in which the first product is indicated as present by the particular current stock condition;
accessing a second location in the particular store in which the first product is indicated as present by the particular current stock condition; and
calculating the route that intersects the first location and the second location in the particular store.

8. The method of claim 1, further comprising:
during a third period of time succeeding the first period of time:
dispatching a particular robotic system, deployed in the particular store, to autonomously scan inventory structures within the particular store during a third scan cycle; and
updating a particular current stock condition of the particular store for the third period of time based on scan data recorded by the particular robotic system during the third scan cycle;
aggregating the particular current stock condition of the particular store during the first time and the particular current stock condition of the particular store during the third period of time to generate a product location map identifying locations of products in the particular store;
annotating the product location map with presence of products in the particular store, based on the particular current stock condition of the particular store during the third period of time, to generate a realogram of the particular store for the third period of time; and
annotating the virtual shopping list with locations of products, in the set of products, based on the realogram of the particular store for the third period of time.

9. The method of claim 1, wherein specifying the particular store for fulfillment of the set of products on the virtual shopping list comprises:
in response to the subset of stores comprising the particular store and a second store following completion of the virtual shopping list, prompting the user to select from the subset of stores; and
recording selection of the particular store by the user.

10. The method of claim 9, further comprising:
during a third period of time succeeding the second period of time:
dispatching a particular robotic system, deployed in the particular store, to autonomously scan inventory structures within the particular store during a third scan cycle; and
updating a particular current stock condition of the particular store for the third period of time based on scan data recorded by the particular robotic system during the third scan cycle; and prior to fulfillment of the virtual shopping list, serving a prompt to the computing device to elect an alternative store, in the subset of stores, for fulfillment of the set of products on the virtual shopping list in response to the particular current stock condition of the particular store for the third period of time excluding a particular product on the virtual shopping list.

11. The method of claim 1, further comprising, during the second period of time:
in response to receiving selection of a pixel in the photographic image:
identifying a second product depicted by the pixel; and
replacing the first product on the virtual shopping list with the second product.

12. The method of claim 1, further comprising:
accessing a set of photographs recorded by the particular robotic system while autonomously scanning inventory structures within the particular store during the first period of time;
fusing groups of photographs, in the set of photographs, into a set of panoramic photographic images, each panoramic photographic image depicting an individual inventory structure in the particular store;
during the second period of time:
serving a second panoramic photographic image, in the set of panoramic photographic images, depicting a second inventory structure in the particular store to the computing device; and
in response to receiving selection of a second pixel in the second panoramic photographic image, identifying a second product depicted by the second pixel; and
adding a second identifier of the second product to the virtual shopping list.

13. The method of claim 1, further comprising:
during an initial period of time preceding the first period of time:
dispatching a particular robotic system, deployed in the particular store, to autonomously scan inventory structures within the particular store during an initial scan cycle; and
updating a particular current stock condition of the particular store for the initial period of time based on scan data recorded by the particular robotic system during the initial scan cycle;
aggregating the particular current stock condition of the particular store during the initial time and the particular current stock condition of the particular store during the first period of time to generate a product location map identifying locations of products in the particular store; and
during the second period of time:
for a second product detected in scan data recorded by the particular robotic system during the initial period of time and obscured in scan data recorded by the particular robotic system during the first period of time, indicating availability of the second product at the particular store during the initial period of time at the computing device; and
for a third product identified in the product location map and detected in scan data recorded by the particular robotic system during the first period of time, indicating availability of the third product at the particular store during the first period of time at the computing device.

14. The method of claim 1, further comprising:
during a third period of time succeeding the first period of time:
autonomously navigating, by a particular robotic system deployed in the particular store, along a set of aisles within the particular store; and
while autonomously navigating along a particular aisle in the set of aisles, recording, by the particular robotic system, a set of color images of a set of inventory structures facing the particular aisle;
detecting a first shelf in a first inventory structure in a first region of a first color image in the set of color images;
identifying an address of the first shelf;
based on the address of the first shelf, retrieving a first list of products assigned to the first shelf by a planogram of the particular store;
retrieving a first set of template images from a database of template images, each template image in the first set of template images comprising features of a product in the first list of products;
extracting a first set of features from the first region of the first color image;
detecting presence of the first product on the first shelf based on alignment between features in the first set of features and features in a first template image, in the first set of template images, corresponding to the first product; and
updating a particular current stock condition of the particular store, for the third period of time, to reflect presence of the first product in the particular store.

15. The method of claim 1, further comprising:
during a third period of time succeeding the first period of time and prior to fulfillment of the virtual shopping list at the particular store:
autonomously navigating, by a particular robotic system deployed in the particular store, along a set of aisles within the particular store; and
while autonomously navigating along a particular aisle in the set of aisles, recording, by the particular robotic system, a set of color images of a set of inventory structures facing the particular aisle;
detecting a first shelf in a first inventory structure in a first region of a first color image in the set of color images;
identifying an address of the first shelf;
based on the address of the first shelf, retrieving a first list of products assigned to the first shelf by a planogram of the particular store;
retrieving a first set of template images from a database of template images, each template image in the first set of template images comprising features of a product in the first list of products;
extracting a first set of features from the first region of the first color image;
detecting absence of the first product on the first shelf based on misalignment between features in the first set of features and features in a first template image, in the first set of template images, corresponding to the first product; and
in response to detecting absence of the first product on the first shelf, serving a prompt to an associate of the particular store to restock the first product on the first shelf.

16. The method of claim 1, further comprising verifying presence of the first product in the store based on a stock condition derived from scan data captured by a particular robotic system while autonomously scanning inventory structures within the particular store during the scan cycle.

\* \* \* \* \*